United States Patent
Sunabashiri et al.

(10) Patent No.: US 6,561,539 B1
(45) Date of Patent: May 13, 2003

(54) AIR BAG DEVICE FOR SIDE COLLISION OF AUTOMOBILE

(75) Inventors: Yukisada Sunabashiri, Tokyo; Hiroshi Sasaki, Hokkaido; Kasumi Seo, Kanagawa-ken, all of (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/308,344

(22) PCT Filed: Sep. 18, 1998

(86) PCT No.: PCT/JP98/04230

§ 371 (c)(1),
(2), (4) Date: Jul. 9, 1999

(87) PCT Pub. No.: WO99/15373

PCT Pub. Date: Apr. 1, 1999

(30) Foreign Application Priority Data

Sep. 19, 1997 (JP) .......................... 9-9255632

(51) Int. Cl.[7] .............................................. B60K 21/12
(52) U.S. Cl. ................ 280/730.1; 280/729; 280/730.2
(58) Field of Search .............................. 280/729, 730.1, 280/730.2, 728.1

(56) References Cited

U.S. PATENT DOCUMENTS

| | | | | |
|---|---|---|---|---|
| 5,306,043 A | * | 4/1994 | Mihm et al. ................. 280/732 |
| 5,310,214 A | * | 5/1994 | Cuevas ....................... 280/729 |
| 5,791,685 A | * | 8/1998 | Lachat et al. ............. 280/743.1 |
| 5,803,485 A | * | 9/1998 | Acker et al. ............. 280/728.2 |
| 5,813,696 A | * | 9/1998 | Hill ........................ 280/743.2 |
| 5,890,732 A | * | 4/1999 | Nakamura et al. .......... 280/729 |
| 5,906,391 A | * | 5/1999 | Weir et al. .................. 280/729 |
| 6,062,594 A | * | 5/2000 | Asano et al. ............. 280/730.2 |
| 6,065,772 A | * | 5/2000 | Yamamoto et al. ......... 280/729 |
| 6,142,507 A | * | 11/2000 | Okuda et al. ............ 280/730.2 |
| 6,206,411 B1 | * | 3/2001 | Sunabashiri ............. 280/730.2 |
| 6,231,069 B1 | * | 5/2001 | Yokoyama ............... 280/730.2 |
| 6,231,070 B1 | * | 5/2001 | Sunabashiri et al. ..... 280/730.2 |
| 6,302,431 B1 | * | 10/2001 | Sasaki et al. ............. 280/730.2 |

FOREIGN PATENT DOCUMENTS

| | | |
|---|---|---|
| JP | 7-267032 | 10/1995 |
| JP | 8-244552 | 9/1996 |
| JP | 9-99793 | 4/1997 |
| JP | 3038479 | 4/1997 |
| JP | 9-118186 | 5/1997 |
| JP | 9-123864 | 5/1997 |
| JP | 10-100827 | 4/1998 |
| JP | 10-297409 | 11/1998 |

* cited by examiner

*Primary Examiner*—Lanna Mai
*Assistant Examiner*—Toan C To
(74) *Attorney, Agent, or Firm*—McDermott, Will & Emery

(57) ABSTRACT

In an airbag 3, a rear end 6a of a partitioning wall cloth 6 is positioned in the vicinity of the shoulder S of a vehicle occupant M, and the partitioning wall cloth 6 extends forward at a more downward angle θ1 than a perpendicular direction Y to the longitudinal direction of an inflator 4. As the partitioning wall cloth 6 is formed downwardly, the volume of a chest protecting portion A is small, so that a speed of the chest protecting portion A spread forward by gas G is increased.

7 Claims, 3 Drawing Sheets

AIR BAG DEVICE FOR SIDE COLLISION OF AUTOMOBILE

TECHNICAL FIELD

The present invention relates to an airbag apparatus for lateral collision of an automobile.

BACKGROUND ART

As an airbag apparatus for an automobile, there is an airbag apparatus for lateral collision where an airbag is spread forward from a side portion of a backrest at a time of lateral collision of an automobile to protect a vehicle occupant (refer to Japanese Patent Application Laid-Open No. 9-136598 as a similar art).

This type of airbag has a generally L-shaped configuration, and is partitioned into an upper head protecting portion and a lower chest protecting portion by a partitioning wall cloth. An inflator is disposed in an opening, and gas discharged from a discharging hole provided at a side face of the inflator first enters into the chest protecting portion to spread the same forward and thereafter enters into the head protecting portion from a vent hole formed on the partitioning wall cloth to spread the same upward.

In such a conventional art, as the airbag is structured such that the chest protecting portion is first spread forward, a spreading speed of the chest protecting portion becomes much important. That is, in an airbag apparatus for lateral collision, a distance between a vehicle occupant and a vehicle body side wall is small, and it is necessary to spread the chest protecting portion between the vehicle occupant and the vehicle body side wall securely and instantaneously. It has been desired to propose a novel airbag apparatus capable of further increasing the spreading speed of the chest protecting portion.

The present invention has been achieved to meet such a requirement, and provides an airbag apparatus for lateral collision of an automobile capable of increasing a spreading speed of a chest protecting portion of an airbag.

DISCLOSURE OF INVENTION

The invention of a first aspect is an airbag apparatus for lateral collision of an automobile comprising a generally L-shaped airbag to be spread forward from a side portion of a backrest, the airbag being provided inside thereof with a partitioning wall cloth to partition the airbag into an upper head protecting portion and a lower chest protecting portion, and the partitioning wall cloth being formed with a vent hole to introducing gas into the head protecting portion, the gas to be discharged from an discharging hole of a side face of an inflator into the chest protecting portion, wherein a rear end of the partitioning wall cloth is positioned in a vicinity of a shoulder of a vehicle occupant and the partitioning wall cloth extends forward at a more downward angle than a perpendicular direction to the longitudinal direction of the inflator.

According to the invention of the first aspect, as the rear end of the partitioning wall cloth is positioned in the vicinity of the shoulder of the vehicle occupant, an upper end of the chest protecting portion (namely, the rear end of the partitioning wall cloth) becomes at least higher than the armpit position of the vehicle occupant, so that the airbag is prevented from entering into the armpit of the vehicle occupant. Accordingly, the chest protecting portion of the airbag is securely spread between the vehicle occupant and the vehicle body side wall. Also, as the partitioning wall cloth is extended forward at the more downward angle than the direction perpendicular to the direction of the longitudinal direction of the inflator while the height required for the chest protecting portion is secured in,this manner, the volume of the chest protecting portion becomes small, which results in improvement in forward spreading speed of the chest protecting portion correspondingly.

As a preferred aspect, the discharging hole for gas is formed at a lower end portion of the side face of the inflator.

According to this aspect, as the, discharging hole for gas is formed at the lower end portion of the side face of the inflator, and the gas is discharged from a bottom face of the chest protecting portion along an inner face thereof, the spread of the chest protecting portion is;accelerated so that the spreading speed thereof is further increased.

As another preferred aspect, in the airbag disposed in a front seat, the vent hole is provided at a rear side of the partitioning wall cloth.

According to this aspect, the vent hole formed at the rear side of the partitioning wall cloth is positioned just in the vicinity of the shoulder of the vehicle occupant. As the neck is positioned immediately above the shoulder in the vicinity thereof and there is a spatial surplus between the vicinity and the vehicle body side wall, as compared with the trunk of the body, the gas can securely be introduced into the head protecting portion through the vent hole formed in the extra space. Accordingly, the reliability and the speed in the spread for the head protecting portion are improved.

As a still another preferred aspect, in the airbag disposed in a rear seat, the vent hole is provided at a front side of the partitioning wall cloth.

According to this aspect, the gas is introduced from the vent hole provided at the front side of the partitioning wall cloth along a front side inner face of the head protecting portion. As the gas introduced along the front side inner face of the head protecting portion is made in a backward situation along the inner face of the head protecting portion as it is, the head protecting portion is spread slightly backward. Accordingly, the head protecting, portion contacts with a rear pillar formed in an oblique state in the vicinity of a rear seat at a situation where the head protecting portion further approaches to a right angle to the rear pillar, so that the airbag is facilitated to spread over a step of the rear pillar.

As a preferred aspect, a width-restricting cloth to connect the left and right faces of the airbag to restrict an expansion in the left and right directions of the airbag is provided in the chest protecting portion.

According to this aspect, as the volume of the chest protecting portion is made further small by the width-restricting cloth, the spreading speed of the chest protecting portion is further improved.

As a still further preferred aspect, a tuck portion is provided on a face of the airbag at a vehicle occupant compartment inner side and the tuck portion is formed by overlapping and sewing a portion of the airbag over a predetermined front and rear directional width.

According to this aspect, as the face of the airbag on the occupant compartment inner side is shorten by formation of the tuck portion, the airbag is spread with the airbag inclined towards the occupant compartment inner side. Accordingly, an interfering force of the airbag acting on the vehicle body side wall is weaken, thereby improving the reliability in the airbag spread. dr

BEST MODE FOR CARRYING OUT THE INVENTION

Preferred embodiments of the present invention will be described with reference to the drawings below.

Figure 1:
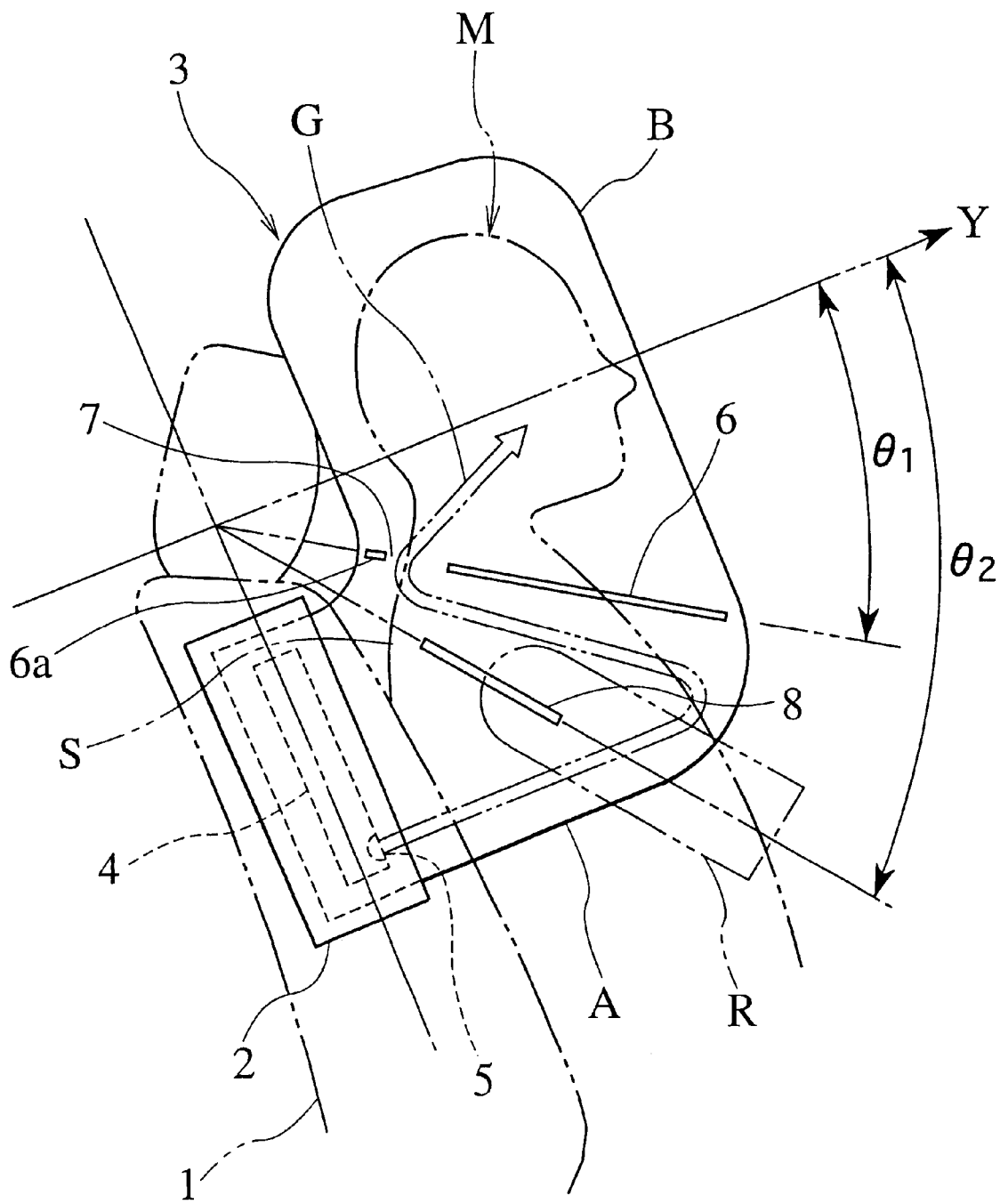
FIG. 1 is a side view showing an airbag apparatus for lateral collision of an automobile according to a first embodiment of the present invention.
Figure 2:
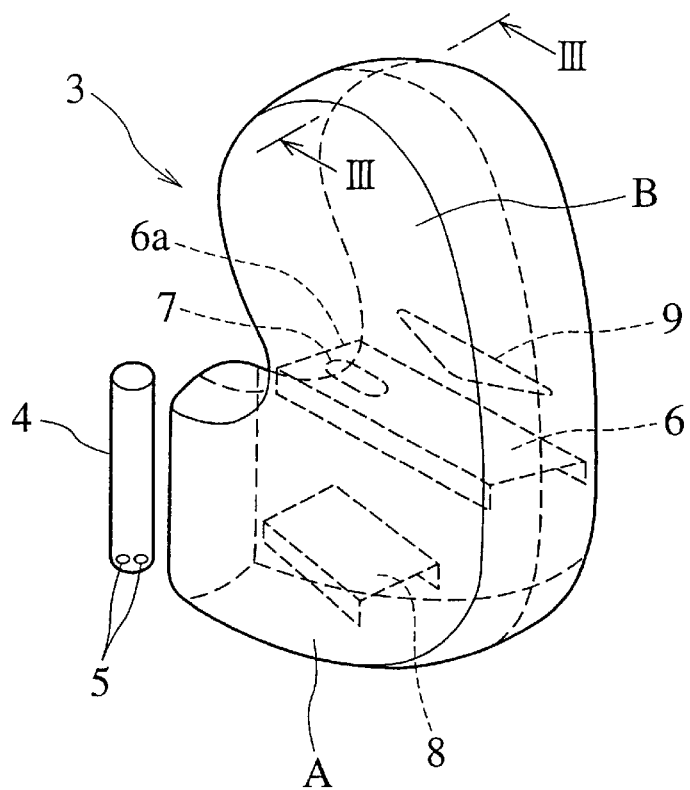
FIG. 2 is a perspective view showing an airbag.
Figure 3:
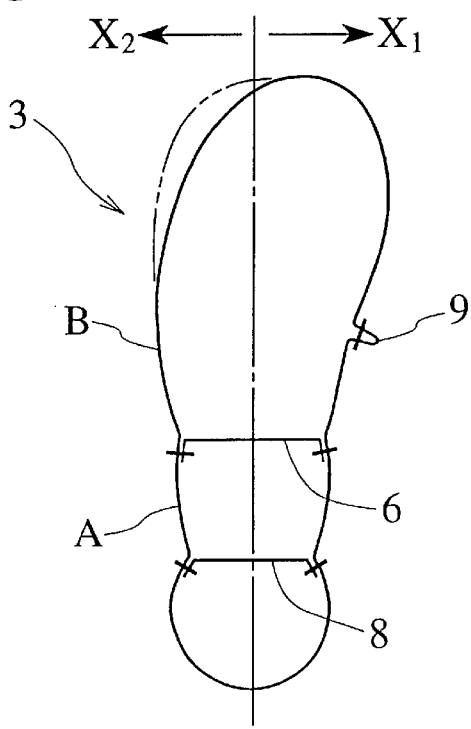
FIG. 3 is a sectional view taken along arrow III—III in FIG. 2.

FIGS. 1 to 3 show a first embodiment of the invention. In FIG. 3, X1 indicates a vehicle occupant compartment inner side and X2 indicates a vehicle occupant compartment outer side.

FIG. 1 is a view where a backrest 1 of a front seat at a driver seat side (right side) is seen from the right side (vehicle outer side). An airbag module 2 is built in a right end portion of the backrest 1. An airbag 3 folded and an inflator 4 to discharge gas G for spreading the airbag 3 are accommodated in the airbag module 2.

The inflator 4 is provided at an opening of the airbag 3, and it is disposed in a state where it extends along the longitudinal direction of the backrest 1. The gas G is discharged from a discharging hole 5 formed at a side face lower end portion of the inflator 4 towards a perpendicular direction Y to the longitudinal direction of the inflator 4.

The airbag 3 is formed in a generally L-shaped configuration, and is provided inside thereof with a partitioning wall cloth 6 partitioning a space of the airbag 3 into a lower chest protecting portion A and an upper head protecting portion B. The partitioning wall cloth 6 has a width corresponding to a front and rear directional width of the airbag 3 and is sewn to left and right side faces of the airbag 3. Accordingly, the partitioning;wall cloth 6 serves not only to partition the airbag 3 into the: chest protecting portion A and the head protecting portion B but also to restrict an expansion in left and right directions of the airbag 3.

A rear end 6a of the partitioning wall cloth 6 is positioned in the vicinity of the shoulder S (an upper portion of the backrest 1) of a vehicle occupant, and the partitioning wall cloth 6 extends forward from the rear end 6a at a more downward angle θ1 than a perpendicular direction Y to the longitudinal direction of the inflator 4.

Also, the partitioning wall cloth 6 is formed at a rear side thereof with a vent hole 7. The vent hole 7 serves to introduce the gas G, discharged from the inflator 4 into the chest protecting portion A, into the head protecting portion B.

A width-restricting cloth 8 for connecting left and right faces of the chest protecting portion A to restrict an expansion of the chest protecting portion A in the left and right directions is sewn inside the chest protecting portion A. The width-restricting cloth 8 is set to be a size where the flow of the gas G is not prevented, and it is set at an angle θ2 directed further downward from the perpendicular direction Y to the longitudinal direction of the inflator 4. The downward angle θ2 is an angle directed along the upper arm R of a dummy doll (ECE Regulation No. 95 EUROSIDE-1) serving as a vehicle occupant M. It is to be noted that the downward angle θ2 of the upper arm R of the dummy doll (E,UROSIDE-1) can be obtained from a defined angle of the upper arm R (the upper arm R is set at 35° to 45° to a face tangential to a front face of a rib).

Also, a tuck portion 9 formed by pick portions of the head protecting portion B over a predetermined front and rear directional width to overlap and sew the same is provided on the vehicle occupant compartment inner face in the head protecting portion B. Accordingly, the vehicle occupant compartment inner side face of the airbag 3 is shorter than the vehicle occupant compartment outer side face thereof.

Next, a spread state of the airbag 3 at a time of lateral collision of an automobile will be explained. When a lateral collision occurs in the vehicle, an agent in the inflator 4 explodes, so that the gas G generated is discharged from the discharging hole 5 in the perpendicular direction Y to the inflator 4.

The gas G discharged first enters into the chest protecting portion A to rupture:an outer skin cover of the backrest 1, thereby spreading the chest protecting portion A. At this time, as the partitioning wall cloth 6 is set at the more downward angle θ1 than the perpendicular direction Y, the volume of the chest protecting portion A is made small, so that a speed at which the chest protecting portion A spreads forward is fast. Accordingly, the chest protecting portion A is spread securely between the chest of the vehicle occupant M and the vehicle body side wall. Restricting the left and right directional width of the chest protecting portion A by the width restricting cloth 8 also serves to make the volume of the chest protecting portion A small, whereby the spreading speed of the chest protecting portion A is further improved.

Also, as the rear end 6a of the partitioning wall cloth 6 is positioned in the vicinity of the shoulder S (the upper portion of the backrest 1) of the vehicle occupant, the upper end position (namely, the rear end 6a) of the chest protecting portion A becomes higher than the armpit position of the vehicle occupant M. Accordingly, as set forth above, even when the volume of the chest protecting portion A is small, the chest protecting portion A is prevented from entering into the armpit of the vehicle occupant M during the forward spread of the chest protecting portion. As a result, the chest protecting portion A is securely spread between the vehicle occupant M and the vehicle body side wall, so that the chest of the vehicle occupant M can be protected.

Providing the discharging hole 5 for the gas G at the side face lower end portion of the inflator 4 also serves to improve the spreading speed of the chest protecting portion A. That is, the gas G is discharged from the bottom face of the chest protecting portion A along the inner face thereof, and the spread of the chest protecting portion A can be accelerated, thereby increasing the spreading speed thereof.

The gas G which has spread the chest protecting portion A enters into the head protecting portion B from the vent hole 7 of the partitioning wall cloth 6 at a forward angle. As the vent hole 7 is formed at the rear side of the partitioning wall cloth 6, the vent hole 7 is positioned just in the vicinity of the shoulder S of the vehicle occupant M. As the neck is positioned immediately above the shoulder S in the vicinity thereof, there is a spatial surplus between the vicinity and the vehicle body side wall, as compared with the trunk of the body. Accordingly, the gas G is introduced into the head protecting portion B side from the vent hole formed in the extra space, so that the head protecting portion B can securely be spread by utilizing the extra space in the vicinity of the shoulder S.

The head protecting portion B is spread upwardly by the gas G entering into the head protecting portion B, so that the head of the vehicle occupant M can be protected by the head protecting portion B. Also, as the tuck portion 9 is formed on the face of the vehicle occupant compartment inner side of the head protecting portion B, the head protecting portion B is spread in a state inclined towards the vehicle occupant compartment inner side. Therefore, the interfering force of the head protecting portion B acting upon the vehicle body side wall is weakened, whereby the spread of the head protecting portion B is further secured.

Figure 4:
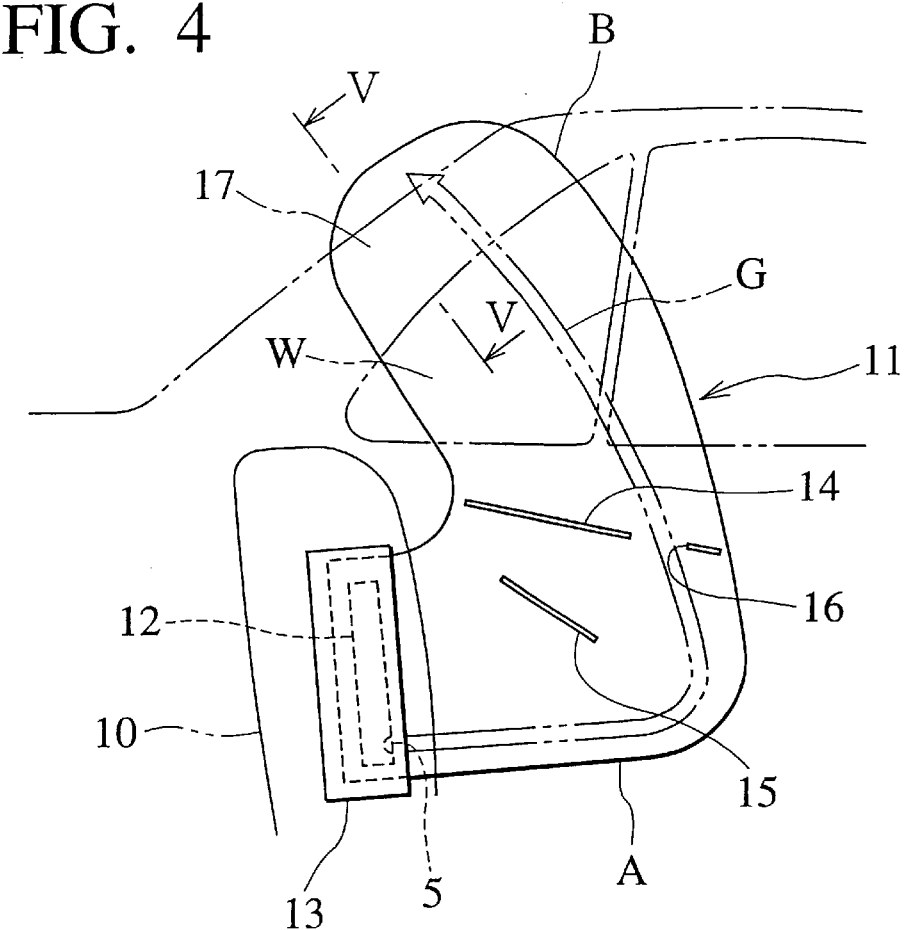
FIG. 4 is a side view showing an airbag apparatus for lateral collision of an automobile according to a second embodiment of the present invention.
Figure 5:
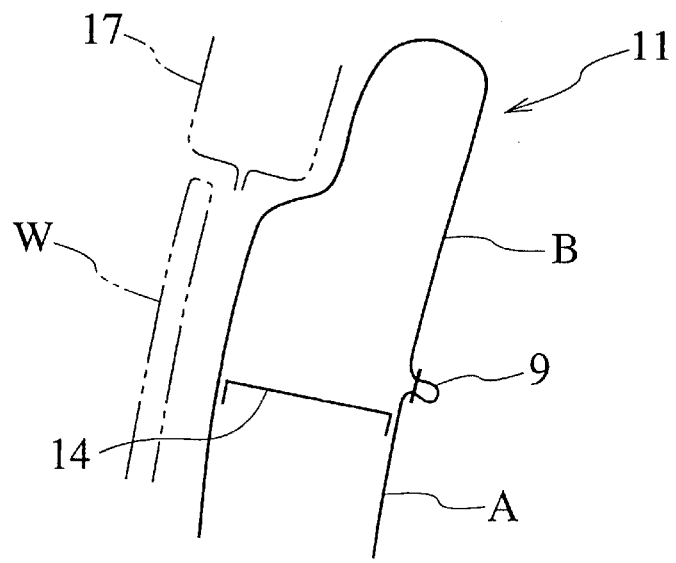
FIG. 5 is a sectional view taken along arrow V—V in FIG. 4.

FIGS. 4 and 5 are views showing a second embodiment of the invention. FIG. 4 is a view where a right side end portion of a rear seat is seen from the right side (from outside of the vehicle). The second embodiment is structured such that an airbag module 13 housing an airbag 11 and an inflator 12 therein is accommodated in a right side end portion. The airbag 11 is provided with a partitioning wall cloth 14 and a width-restricting cloth 15 like the first embodiment. The tuck portion 9 is also formed at the vehicle occupant compartment inner side of the airbag 11. The difference between the second embodiment and the first embodiment lies in the position of a vent hole 16 provided in the partitioning wall cloth 14. In the second embodiment, the vent hole 16 is provided at a front side of the partitioning wall cloth 14.

For this reason, the gas G entering from the chest protecting portion A via the vent hole 16 is introduced the whole head protecting portion B along a front side inner face of the head protecting portion B. As the gas G introduced along the front side inner face of the head protecting portion B is made in a backward situation along the. inner face of the head protecting portion B as it is, the head protecting portion B is spread slightly backward. Accordingly, the head protecting portion B contacts with a rear pillar 17 formed in an oblique state in the vicinity of a rear seat at a situation where it further approaches to a right angle to the rear pillar. As shown in FIG. 5, an upper side portion of the airbag 11 positioned above the tuck portion 9 is inclined towards the vehicle occupant compartment inner side by the tuck portion 9 formed at the vehicle occupant compartment inner side of the airbag 11, so that a distal portion of the head protecting portion B is facilitated to spread over a step of the rear pillar 17. Reference character W indicates a rear window panel.

Industrial Applicability

As the above, the airbag apparatus for lateral collision of an automobile according to the present invention is useful for protecting a vehicle occupant of his/her own automobile when the automobile is collided with another automobile.

What is claimed is:

1. An airbag apparatus for lateral collision of an automobile, comprising:
  an inflator having a discharging hole at a side face thereof, the inflator being adapted to discharge a gas from the discharging hole during a lateral collision;
  an airbag accommodating the inflator, the airbag being adapted to be spread forward in a generally L-shaped configuration, the airbag having a head protecting portion and a chest protecting portion, the chest protecting portion receiving directly the gas discharged from the inflator; and
  a partition cloth provided inside the airbag, the partition cloth separating the airbag into the head protecting portion and the chest protecting portion, the partition cloth comprising:
    a rear end defining one vent hole;
    a remaining portion, except for the rear end, the remaining portion being totally closed off so that, during the lateral collision, the gas is introduced from the chest protecting portion to the head protecting portion only through said one vent hole, the rear end positioned in a vicinity of a shoulder of a vehicle occupant, and the partition cloth extends forward at a downward angle relative to a perpendicular direction to the longitudinal direction of the inflator; and
  a width-restricting cloth connecting left and right faces of the airbag in the chest protecting portion to restrict an expansion of the airbag in left and right directions thereof, wherein
  said width-restricting cloth extends forward at a first downward angle relative to said perpendicular direction, wherein said partition cloth extends forward at a second downward angel relative to the perpendicular direction, and wherein the first downward angle is larger than the second downward angle.

2. An airbag apparatus for lateral collision of an automobile according to claim 1, wherein said discharging hole is formed at a lower end portion of said side face of said inflator.

3. An airbag apparatus for lateral collision of an automobile according to claim 1, wherein a tuck portion is provided on a face of said airbag at a vehicle occupant compartment inner side, and said tuck portion is formed by overlapping and sewing a portion of said airbag over a predetermined front and rear direction width.

4. An airbag apparatus for protecting vehicle occupants during a lateral collision of an automobile, the airbag apparatus comprising:
  an inflator that discharges a gas;
  an airbag that houses the inflator in a bottom portion of the airbag and that is adapted to expand during the lateral collision in a generally L-shapecd manner, the airbag including a partition cloth extending in rearward and forward directions at a downward angle relative to a direction that is perpendicular to a longitudinal axis of the inflator, wherein the partition cloth separates the airbag into a chest protecting portion and a head protecting portion, wherein the partition cloth defines a vent hole in a rearward end of the airbag, wherein a rear portion of the partition cloth is adapted to be positioned in a shoulder region of a vehicle occupant; and
  a width restricting cloth connected to lateral faces of the airbag to restrict expansion of the airbag in a lateral direction,
  wherein the width restricting cloth extends forward and rearward at a downward angle relative to a direction that is perpendicular to the longitudinal axis of the inflator that is greater than the downward angle at which the partition cloth extends relative to the perpendicular direction.

5. An airbag apparatus as claimed in claim 4, wherein the vent hole is adapted to be positioned in a neck region of a vehicle occupant.

6. An airbag apparatus as claimed in claim 4, further comprising a tuck portion on an inner lateral face of the airbag, the tuck portion being formed by overlapping and connecting a predetermined length and width of the inner lateral face of the airbag.

7. An airbag apparatus as claimed in claim 6, wherein the tuck portion causes the inner lateral face to be shortened, thereby causing the inner lateral face to be inclined toward an interior of the vehicle during a lateral collision.

* * * * *

UNITED STATES PATENT AND TRADEMARK OFFICE
CERTIFICATE OF CORRECTION

PATENT NO. : 6,561,539 B1
DATED : May 13, 2003
INVENTOR(S) : Yukisada Sunabashiri et al.

It is certified that error appears in the above-identified patent and that said Letters Patent is hereby corrected as shown below:

<u>Title page,</u>
Item [30], Foreign Application Priority Data, change "9-9255632" to
-- 9-255632 --

Signed and Sealed this

Thirtieth Day of September, 2003

JAMES E. ROGAN
*Director of the United States Patent and Trademark Office*